United States Patent [19]

Reuter

[11] 4,077,107

[45] Mar. 7, 1978

[54] METHOD OF MANUFACTURING FRICTION PLATES AND PLATES MADE BY THE METHOD

[75] Inventor: David F. Reuter, Xenia, Ohio

[73] Assignee: General Motors Corporation, Detroit, Mich.

[21] Appl. No.: 745,430

[22] Filed: Nov. 26, 1976

Related U.S. Application Data

[62] Division of Ser. No. 634,253, Jan. 21, 1975, Pat. No. 4,010,831.

[51] Int. Cl.² .................... B21D 53/26; B21D 53/00
[52] U.S. Cl. ..................... 29/400 R; 29/156.61; 29/159.01; 29/412; 72/132; 72/142; 72/146; 72/206
[58] Field of Search ........... 29/156.61, 156.62, 159.01, 29/412, 414, DIG. 32, 400 M, 400 R; 72/240, 102, 105, 135, 132, 142

[56] References Cited

U.S. PATENT DOCUMENTS

| 978,974 | 12/1910 | Wilson | 10/86 B |
| 1,762,556 | 6/1930 | Marshall | 72/132 |
| 3,608,347 | 9/1971 | Kemminer | 72/142 |

FOREIGN PATENT DOCUMENTS 1,248,473  10/1971  United Kingdom.

Primary Examiner—Milton S. Mehr
Attorney, Agent, or Firm—A. M. Heiter

[57] ABSTRACT

A method of edge coiling annular steel plates for transmission friction plate devices in which straight tapered strip steel stock with prime spline tangs on one edge are edge rolled into open annular steel plates with finished spline tangs leaving a gap between the unjoined free ends. The strip steel stock is slit into straight flat strips having a width double the total face width of the annular plate. The flat double width strip is rolled to provide a symmetrical tapered double width strip having a central thick flat portion and on each side a symmetrically tapered portion with thin edges. The double width tapered strip is blanked in the central portion to form uniformly spaced prime spline tangs each having a central recess and slit to divide the double width strip into two single width tapered strips with the recessed prime spline tangs on the thick edge. The single width tapered strips are edge rolled in an edge rolling machine feeding the strips in a straight guide to a coiling roll having a cylindrical surface with relief recesses and a tooth in each relief recess to engage the thick edge of the strip with the relief recesses providing clearance for the prime spline tangs and the tooth engaging the base of the central recess for uniform circular coiling and having side guides spaced apart the mean thickness of the tapered strip to hold the coil flat. Then the end coil is cut off to form the open annular steel plate.

9 Claims, 27 Drawing Figures

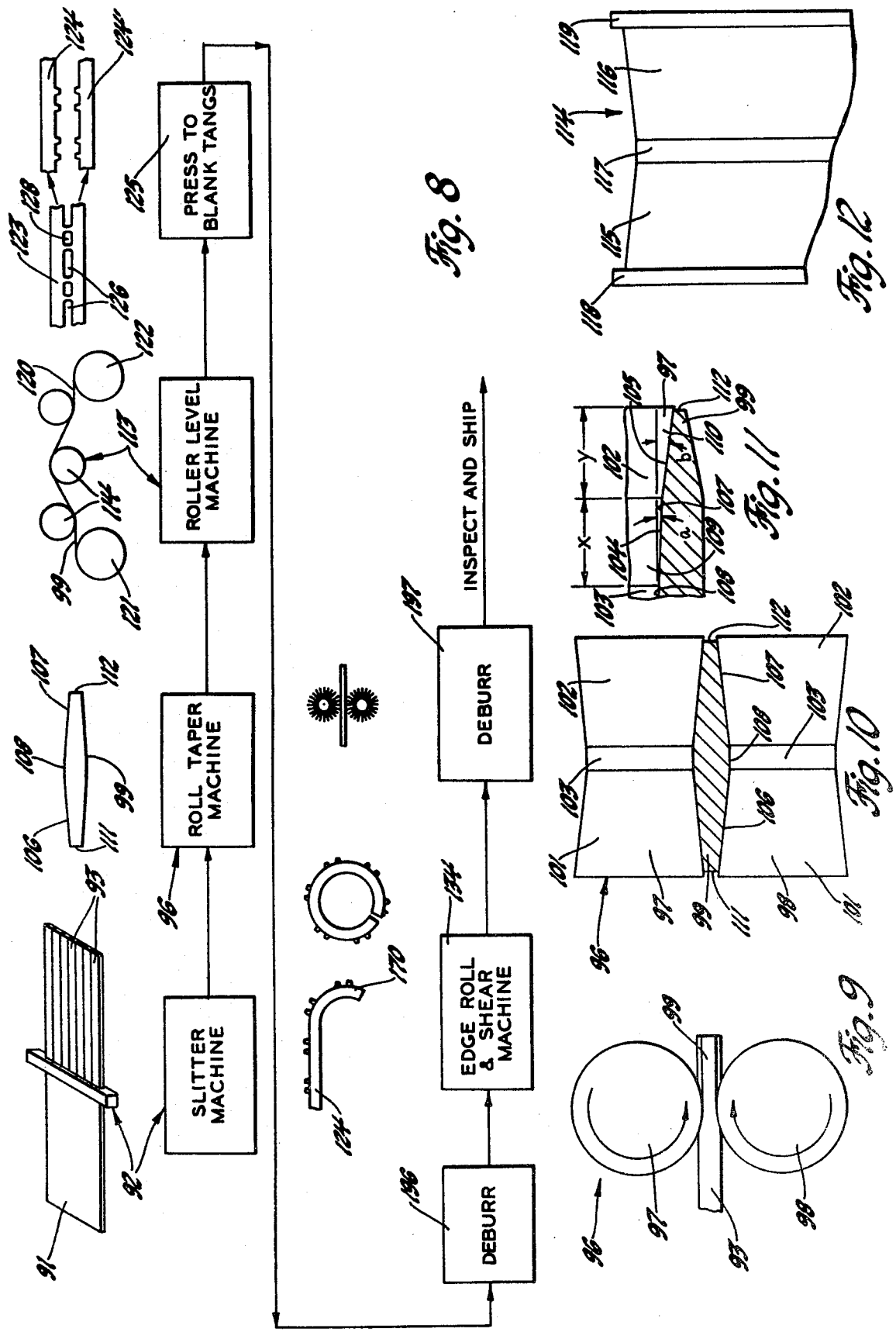

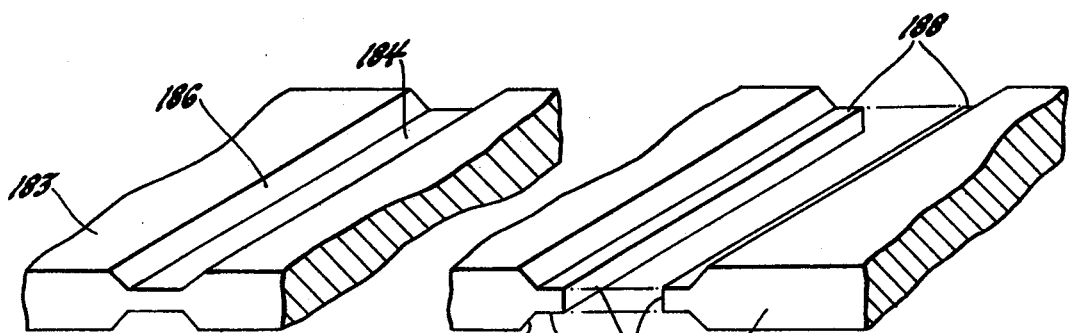
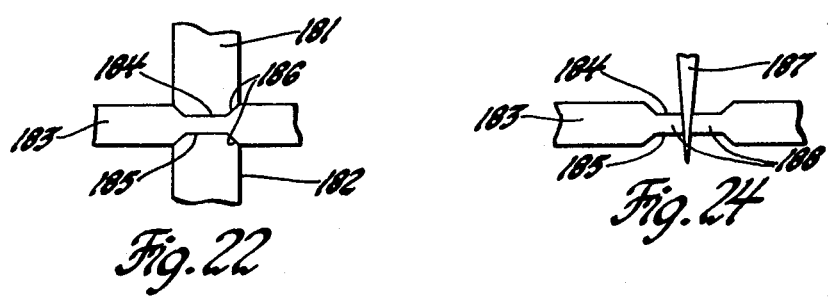
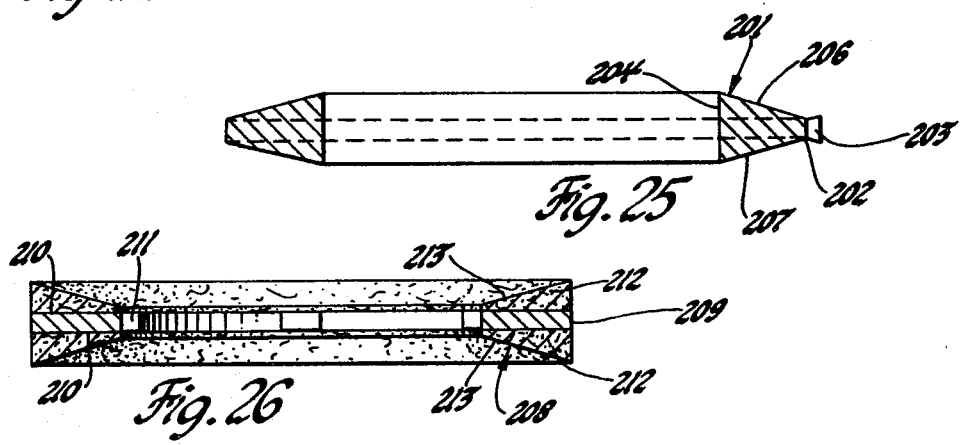
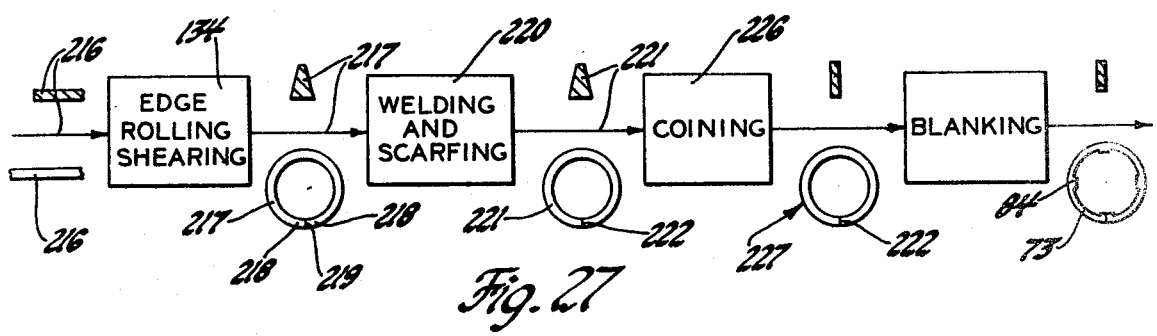

METHOD OF MANUFACTURING FRICTION PLATES AND PLATES MADE BY THE METHOD

This is a division of application Ser. No. 634,253 filed Nov. 21, 1975 now U.S. Pat. No. 4,010,831, granted Mar. 8, 1977. This invention relates to methods and apparatus for edge rolling annular plates for friction drive devices and plates made by the method.

The invention provides a method of manufacture by edge coiling an open annular friction plate with finished splines for multiplate friction drive estabilishing devices such as reaction brakes and drive clutches used in drive trains and powershift transmissions to engage the drives.

In the manufacturing process, single width straight steel strip stock with prime spline tangs on one edge are edge rolled into annular friction plates. The edge rolling process drastically reduces strip steel stock requirements as compared to blanking complete annular plates from strip steel stock. Since friction plates require a high degree of flatness and have spline tangs, conventional edge rolling processes are inadequate. In the edge rolling machine the single width straight strip is maintained straight in a guide and fed by a feed mechanism so the inner edge of the strip engages the cyindrical surface of a mandrel roll and the outer edge engages the cylindrical surface of a coiling roll to coil the strip. The roll engaging the edge of the strip with spline tags has relief recesses to receive the spline tangs with clearance.

Each prime spline tang, the beginning stage of the spline tang, on the straight strip has a large central recess having a base portion, preferably flat, between a spaced pair of thin prongs. The base of the recess is engaged by a portion or tooth of the coiling roll located centrally in each relief recess to support the strip during edge rolling into an annulus in circular form at each spline tang. A large number of splines are used so each prong may be sufficiently thin in a circumferential direction for substantially unifom resistance to coiling for uniform circular coiling and so the prongs do not participate in coiling to avoid change of tang shape and thinning especially in the face width area at the tang root and yet provide sufficient total thickness to support the friction plate load on the drum splines. The outer side portion of each prime prong has a slope in relation to the edge of the straight strip which provides, after edge rolling the strip into an annulus, the normal spline slope of finished spline tangs for surface engagement with the splines in a drum.

The rolls have side guides each engaging at least half of the face width of the opposite faces of the strip to hold the strip flat during coiling. As the continuous feed mechanism feeds the straight strip it is continuously coiled and moves past the coiling roll and is then raised just sufficiently to clear the mandrel and coiling roll and overlap the following portion being coiled between the rolls to form a complete annular coil, a substantially true circle, beyond the coiling roll at a shearing station. As the end of the strip enters the shearing station, the shearing tool cuts off one complete annular coil to make a friction plate.

The open annular plates with the spline tangs on the outer diameter are edge rolled from a single width tapered straight strip having splines on the thick edge. In the edge rolling machine the single width tapered strip is maintained straight and fed by a feed mechanism to engage a coiling roll having a cylindrical surface to engage the thick outer edge of the single width tapered strip between the tangs and spaced relief recesses in the cylindrical surface to receive the tangs to edge roll the single width tapered strip into a coil. When the end of a complete annular coil enters a shearing station, it is cut off to form an open annular steel plate with a gap between the free ends.

In the complete manufacturing process for the open annular plate, flat strip steel stock is first slit into straight flat double width strips which are rolled to form a symmetrically tapered double width strip preferably having a flat central portion with a symmetrically tapered portion on each side tapered to a thin edge. The central portion has a width sufficient to provide the prime spline tangs preferably double the height of the spline tangs. Each tapered portion has a mean thickness equal to the thickness of the completed open annular plate centrally of the tapered portion, tapers from the thin edge with increasing thickness to the same thickness as the thicker flat central portion. Each tapered portion is symmetrically tapered, tapered on both faces, with a taper, slightly greater near the thin edge, so that the completed edge rolled open annular plate has flat parallel faces. Then the tapered double width strips are roller leveled for stress relief and straightening on a roller leveling machine. The roller leveling machine has a plurality of freely rotating rollers spaced along the machine axis with alternate rolls moving the strip to one side of the axis and intermediate rolls moving the strip to the opposite side of the axis so a strip being continuously moved or drawn under tension through the rolls by a recoiler is progressively undulated under tension to provide alternate yielding of the steel in tension and compression to relieve internal stresses. The rolls have a flat central portion and symmetrically tapered side portions to fit or match one face of the tapered double width strip and edge shoulders to guide the strip and to smooth and dimension both edges of the strip and to straighten the strip. Then the stress relieved straight tapered double width strip passes through a blanking press to blank the central portion to form a series of prime spline tangs with intermediate straight portions at the thick edge of each tapered portion and to divide or separate the double width strip into two straight tapered single width strips with prime spline tangs on the thick edge and a straight thin edge. In the blanking operation the tangs are formed opposite each other in a central portion having a width double the tang height for blanking die simplicity but may be formed alternately with the tangs of one single width strip between the tangs of the other single width strip in a central portion having a width equal to the tang height for material saving. Then the single width strip may be deburred.

Then the tapered single width strip is edge coiled in the edge rolling machine with the thick edge with tangs engaging a coiling roll having a cylindrical surface with relief recesses to receive the tangs during coiling to form coils. Then a cut off shearing tool cuts out a small portion of the coil at the leading end of the formed annular coil to form the trailing end of the formed annular coil and the leading end of the next coil as it is being formed to form an open annular plate with a small gap between the free sheared ends which are rounded by coining.

To form the closed annular plates, straight flat single width strips are edge rolled and cut off with a single shear cut to form a complete annular tapered coil. The ends of the coil are welded together having a weld thickness slightly less than the thickness of the finished plate. The welded tapered annular coil is then coined to form a welded flat annular coil and blanked to form one edge with tangs and the other edge smooth to form a complete annular plate. The complete annular plate may be cut and the ends coined to form an open annular plate.

These and other features of the preferred embodiments of the invention are described in the following description and drawing.

FIG. 8 is a process diagrammatic view showing the steps of a process for manufacturing open annular friction plates.

FIG. 9 is a diagrammatic end view of the taper rolls of a rolling mill rolling a strip.

FIG. 10 is a diagrammatic plan view of the taper rolls of a rolling mill with the strip in section.

FIG. 11 is a partial diagrammatic enlarged view showing the taper detail of the taper rolls.

FIG. 12 is a partial detail view of a roll for a roller leveling machine.

FIG. 21 is a partial perspective view of the coiled strip bevel recessed for slitting.

FIG. 22 is a partial sectional view showing the stamping or coining tools engaging the blank to form the recess of FIG. 16.

FIG. 23 is a partial view of the blank after slitting.

FIG. 24 shows the relationship of the slitter cutter to the blank during the cutting operation.

FIG. 25 shows an edge rolled tapered steel clutch plate.

FIG. 26 shows a clutch plate with tapered friction material for operation with the clutch plate of FIG. 25.

FIG. 27 is a process diagrammatic view of a modified process for making continuous or open annular friction plates.

The basic transmission gearing and controls are conventional, e.g., as shown in Van Lent et al. U.S. Pat. No. 3,541,887 patented Nov. 24, 1970 or the related Winchell et al. U.S. Pat. No. 3,321,056 patented May 23, 1967. In the transmission multiplate clutches and brakes, the conventional complete annular unfaced steel plates located between faced steel plates are replaced by open annular unfaced steel plates having a gap between the unjoined spaced free ends.

Figure 1:
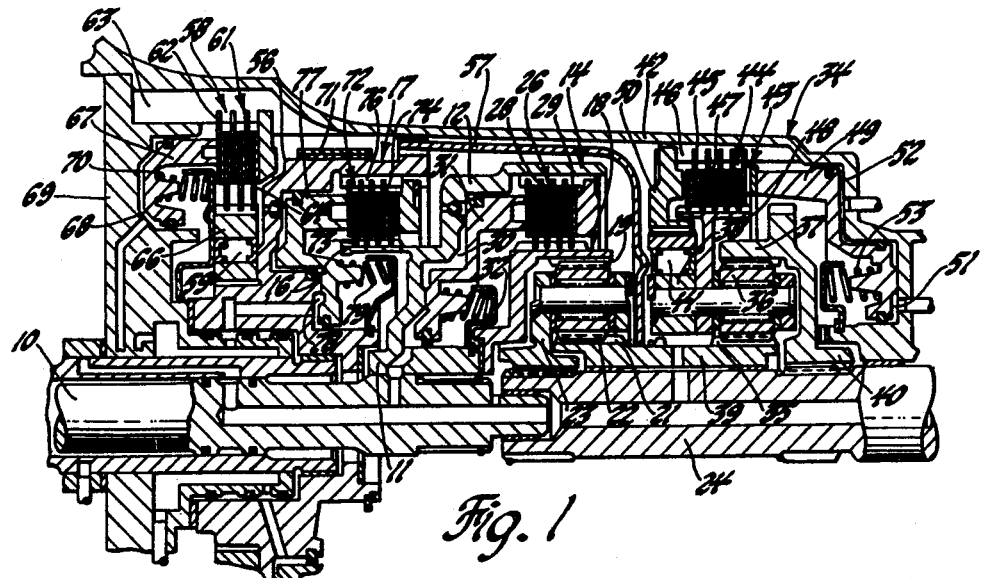
FIG. 1 is a partial sectional view of the transmission.

Referring to FIG. 1, the transmission may have a conventional engine driven torque converter (not shown) driving input shaft 10. The input shaft is splined to and drives input hub 11 having outer driving clutch drum 12 of forward drive clutch 14 and inner driving clutch drum 16 of direct drive and reverse clutch 17. A front planetary gear unit 18 includes inner forward clutch drum and ring gear member 19 and sun gear 21 in mesh with planet pinion 22 rotatably supported in carrier 23 splined to power output shaft 24. The forward clutch 14 has clutch plate pack 26 with drive clutch plates 28 splined on drum 12 and drive clutch plates 29 splined on drum ring gear member 10 which are engaged upon admission of fluid pressure to a servo chamber 30 formed between clutch drum hub 11 and a servo piston 31. A release spring and abutment 32 biases piston 31 toward its clutch release position.

A rear planetary gear unit 34 includes sun gear 35 and ring gear 37 in mesh with plane pinion 36 rotatably supported in carrier 38. Sun gear 35 is connected by a sleeve shaft 39 to be integral with sun gear 21. Ring gear 37 is drive connected or fixed for rotation with output shaft 24 by hub 40. A one-way brake 41 grounded by fixed abutment 50 to housing 42 prevents rotation of planet carrier 38 in one direction and permits rotation of carrier 38 in the opposite direction. A plate brake 43 has brake plate pack 44, including stationary plates 45 splined on outer spline drum portion 46 of housing 42 and reaction plates 47 splined on inner drum 48 on carrier 38, may be engaged to prevent rotation of carrier 38 in either direction. Brake 43 is engaged when operating in reverse and low range forward operation. Dual piston 49 for actuating brake 43 by engaging the plates against fixed abutment 50 is provided with two separate servo chambers 51 and 52. Chamber 52 receives fluid pressure when operating in low range forward and both chambers 51 and 52 are supplied with fluid when operating in reverse so the engagement force meets torque requirements for smooth shifting. Spring and abutment 53 biases piston 49 toward the brake release position.

Drum 56 connected for rotation as a unit with sun gears 21, 35, by connector 57 and sleeve 39, is adapted to be braked against rotation in one direction by a second gear plate brake 58 and a one-way brake 59 in series. Plate brake 58 which includes brake plate pack 61 having stationary plates 62 splined on outer splined drum portion 63 of housing 42 and reaction plates 64 splined on inner drum and outer race portion 66 of oneway brake 59 may be engaged by a servo piston 67 upon admission of fluid under pressure to servo chamber 68 in transverse wall 69 of housing 42. Abutment and spring 70 yieldably biases piston 67 to its brake release position. With brake 58 engaged, sun gears 21 and 35 are locked against rotation in one direction and are permitted to rotate in the opposite direction by one-way brake 59. A second gear overrun brake band 71 may, at times, be applied to drum 56 to prevent rotation of sun gears 21 and 35 in either direction, particularly for engine braking during coasting.

A direct drive and reverse clutch 17 includes clutch pack 72 having drive clutch plates 73 splined on clutch input drum 16 and driven clutch plates 74 splined on the internal spline drum portion 76 of drum 56. Plates 73 and 74 are engaged by a piston 77 upon admission of pressure to a servo chamber 78 which may be dual with direct apply pressure supplied to a smaller area than reverse apply pressure for smoothly engaging direct drive and reverse as shown in the above patents. An abutment spring 79 biases piston 77 towards its clutch release position.

For neutral, the reaction brakes, second ratio plate brake 58 which controls one-way brake 59, second ratio two-way drive brake band 71, two-way first ratio plate brake 43 and the clutches, forward plate clutch 14 and direct and reverse plate clutch 17, are disengaged. In the shift schedule, forward clutch 14 is engaged in all forward drives and the following additional devices are engaged in each forward drive. In drive range, one-way brake 41 locks for one-way first ratio drive, second ratio plate brake 58 is engaged and locks one-way brake 59 for one-way second ratio drive causing one-way first brake 41 to freewheel and direct reverse plate clutch 17 is engaged for two-way third ratio drive causing both one-way brakes 41 and 59 to freewheel. In intermediate range band 71 is also engaged for two-way second ratio drives. In low range plate brake 43 is also engaged for two-way first ratio drive. In reverse only low reverse plate brake 43 and direct reverse plate clutch 17 are engaged.

Figure 2:
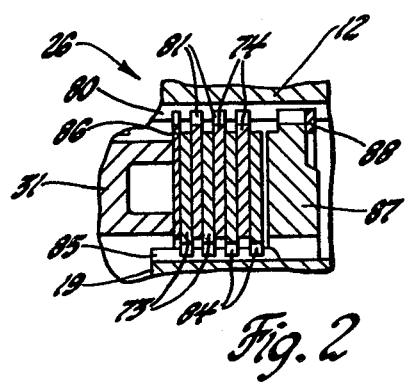
FIG. 2 is an enlarged partial sectional view showing the friction device pack.
Figure 3:
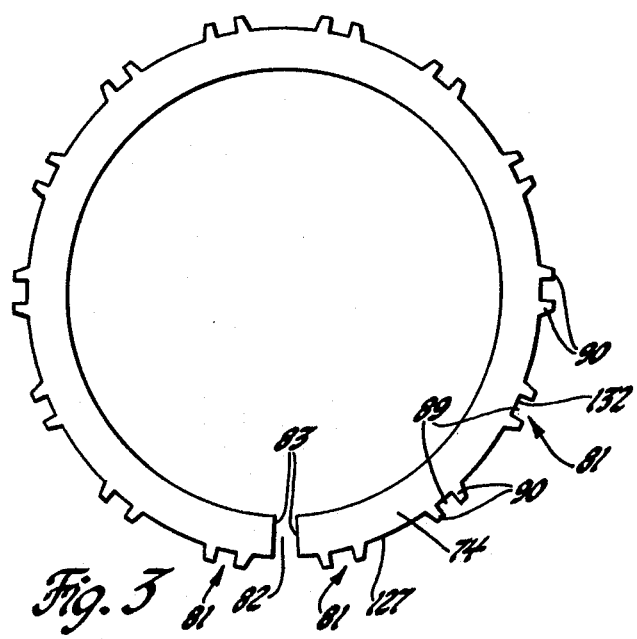
FIG. 3 is a plan view of an open annular friction plate.
Figure 4:
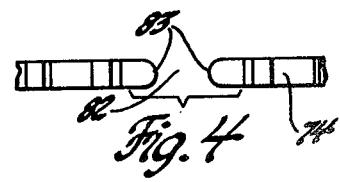
FIG. 4 is a partial elevation view of the plate of FIG. 3 at the gap.
Figure 5:
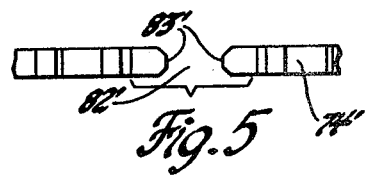
FIG. 5 is a partial plan view of the plate at the gap, showing a modified gap.

Referring to FIG. 2, one type of friction plate pack, the forward clutch plack 26 has an outer driving drum 12 having internal splines 80 spline connected to the external finished spline tangs 81 of the unfaced interrupted or open annular steel plates 74. The unfaced open plates have a through slit or gap 82, FIGS. 3, 4 and 5, extending completely through the plate between the two free unjoined spaced rounded ends 83 located preferably centrally between a pair of tangs 81. The gap has a small width, not more than 0.250 inch, so the free ends are spaced apart sufficiently so the ends do not contact during clutch pack operation. The ends are smoothly rounded bevel ends 83, FIG. 4 or smoothly flat beveled ends 83', FIG. 5 or FIG. 23, so the free ends do not have a sharp or rough edge that could contact and mar the friction material surface of the contacting uninterrupted annular faced plates 73. The beveled ends, rounded or flat, do not cause undue wear and do direct a proper limited amount of oil to the interface of the plates and wipe excess oil from the faced plates.

At each side of the unfaced plates there is a friction material faced uninterrupted or complete annular friction material faced steel plate 73 having internal finished spline tangs 84 spline connected to external splines 85 on inner driven drum 19. The spline connection between each plate and its drum permits relative axial movement for engagement and release but prevents relative rotary movement. The piston 31 engages a waved steel plate 86 splined to internal splines 80 of drum 12 or other conventional cushioning means for providing cushioned engagement by the piston. The backing plate 87 is a rigid plate axially and rotatably fixed by snap ring 88 and external splines to the internal splines 80 of outer drum 12. The direct reverse clutch pack 72 has a similar construction except the inner drum 16 is the driving drum and the outer drum 56 is the driven drum.

Another type of friction plate pack, the brake plate packs 44 and 61 are similar except respectively the outer drums 46 and 63 are stationary drums integral or fixed to housing 42 which ground the reaction torque and the inner drums 48 and 66 are rotary drums providing reaction torque for the gearing. In these brake plate packs the open annular unfaced steel plates are the stationary grounded reaction plates and the complete annular faced steel plates are the gear reaction plates which rotate when released. In the brake packs the open annular steel plates are stationary so there is no centifugal force on these plates. The outer drum 12 of the forward clutch and the outer drum 56 of the direct reverse clutch do not exceed input or output speeds during transmission operation and normally rotate at lower speed when these clutches are disengaged so the centrifugal force on the open annular steel plates is not excessive.

Figure 13:
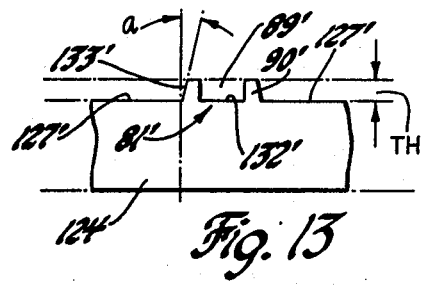
FIG. 13 is a partial enlarged view of a prime spline tang on the blanked single width strip.

All the open annular steel plates are like plates 74 and are edge rolled from straight strips having prime spline tangs 81', FIG. 13. The prime spline tangs 81' have a central recess 89' and a pair of thin prong portions 90' on each side to facilitate edge rolling into a uniformly true circle annular plate. A large number of finished splines 81 are used so that the total root thickness of all the finished spline prongs 90 will support the friction load on the plate and the prime prongs 90' are sufficiently thin so they do not significantly interfere with edge rolling into a true circle. The prime spline prongs 90' are filleted at the base corner with the thick straight edge 127' to reduce stress risers at these corners of the finished spline prongs 90 with circular outer edge 127. The base 132' of prime spline tang recess 89' preferably is aligned with edge 127' for uniform width of the strip and uniform coiling and thickness of the coiled strip but may be slightly, a few thousandths, above edge 127' to increase the strength of the finished spline prongs 90 without significant interference with circular coiling. The complete annular plates 73 may be made by a blanking process described below and have spline tangs 84 without a recess.

The fluid operated clutches and brakes provide fluid operated friction drive establishing devices having multiplate packs which are used in power shift transmissions having manual or automatic controls to establish a plurality of ratio drives. When the servo motor provides the proper force and the friction and wear characteristics of the multiplate packs are proper and stable, the friction drive establishing devices provide good quality smooth shifts with good endurance.

Figure 6:
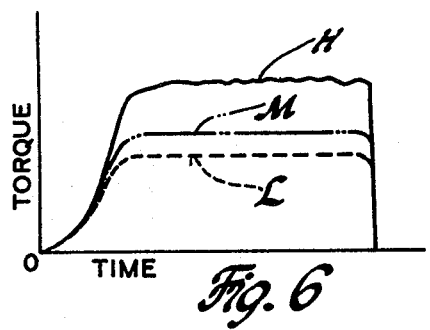
FIG. 6 is a graph showing output torque plotted against time for a friction device with open annular steel plates.
Figure 7:
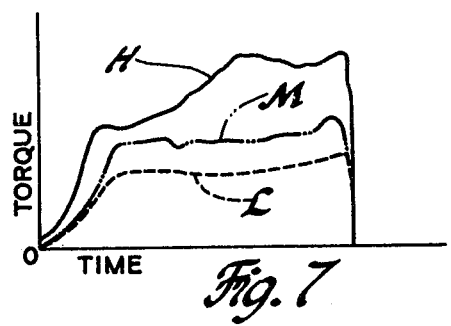
FIG. 7 is a graph plotting output torque against time for a friction device will all complete annular plates.

One test employed to evaluate clutch and brake friction plate pack characteristics employs a dynaometer having a motor which accelerates an inertia mass to a predetermined free spin speed. Then the grounded friction plate pack is applied or engaged to stop the freely spinning inertia mass and output torque is plotted relative to time as shown in the FIGS. 6 and 7 curves at increasing energy and torque levels provided by repeating the test with a larger inertia mass. Since the degree of microfinish and flatness of the steel plates are important considerations in providing proper and stable friction characteristics for smooth shifts, these characteristics are controlled within quite narrow tolerance limitations when the conventional complete annular steel plates are used to provide smooth shifts. Clutch or brake packs having such complete annular steel plates with less than the desired flatness provide an uneven increase of torque with time providing less shift smoothness as indicated by the torque relative to time curves of FIG. 7 as compared to similar clutch or brake packs having a similar but open annular steel plates which provide a more even increase of torque with time as indicated by the more uniform torque relative to time curves of FIG. 6 providing more shift smoothness. The low energy test level curves L demonstrate the frictional stability of the pack. The moderate energy level curve M shows the durability, wear and frictional characteristics of the pack. The high energy test curve H shows the degree of abuse in very severe loading conditions that the pack can withstand. The pack with unfaced open annular steel plates shows good characteristics, as indicated by the FIG. 6 curves, e.g., steady reduced outlet temperature, consistance in coefficient of friction values, minimum stack wear, uniform, even and steady torque curves without erratic slipping or grabbing and no excessive flaking, glazing or erosion of the friction material on the faced complete annular plates, as good as and in some cases better than conventional packs wil all complete annular steel plates as indicated by the FIG. 7 curves. Since less force is required to flatten an open annular plate than a complete annular plate, it is believed that there is better surface contact between plates even though there is a small degree of lack of flatness of new plates within manufacturing tolerances and of plates in use resulting from heat during normal operation. Also the gap in open annular plates acts to distribute oil when the plates are spaced apart and then as a wiper to help remove the last bit of fluid trapped between plates as they come together during final engagement under pressure to make a drier contact between the steel and friction material plates.

Figure 14:
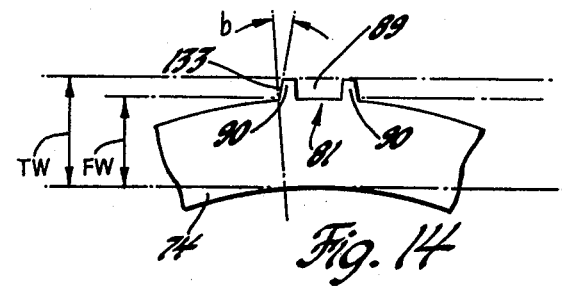
FIG. 14 is a partial enlarged view of a finished spline tang on the completed annular plate.

The open annular steel plates 74 are manufactured by an edge rolling process diagrammatically illustrated in FIG. 8. The process employs as a starting material strip carbon steel of good quality having a moderate Rockwell hardness and a good surface finish such as hot rolled steel, e.g., SAE 1010, 1020 or 1035 range having a Rockwell hardness preferably in the B80 to B100 range, a good surface finish up to 20–22 micro-inches and thickness not varying over 0.001 inch in 10 inches. These steel strips can be cold worked and are cold work hardenable. The strip steel stock is at least a little thicker, e.g., 0.073 inch thick than the finished plate, e.g., 0.070 inch, but the stock is preferably thicker e.g., 0.077 for hard stock or 0.084 for softer stock to increase the amount of cold work for improving surface finish and hardness. The wider strip steel stock 91 is slit in a conventional slitter 92 into straight flat steel strips 93 having a width nearly twice that of the total width TW of the plate, the working face width FW plus the tang height TH. FIGS. 13 and 14. The flat double width strips 93 have an equivalent width slightly less than the double width so that the next taper rolling step provides a thinner double width tapered strip having the full double width. The slit flat straight strips 93 are then roller tapered by a conventional taper roller machine 96 having final rolls 97 and 98 shaped to provide the symmetrically tapered double width strip requirement in the process. The upper and lower rolls 97 and 98 are identical and as the flat double width strips 93 pass between the rolls, they are formed into the symmetrically tapered double width strip 99. Each of the rolls 97, 98 have side tapered conical portions 101, 102 with a central flat cylindrical portion 103 which respectively form the symmetrically tapered side portions 106 and 107 and the central flat portion 108 of the tapered double width strip 99. The tapered double width strip has a cross section that is completely symmetrical, that is symmetrical about the central transverse long axis, horizontal as viewed in FIG. 10, and the central thickness short axis, vertical as viewed. The tapered double width strip 99 has a full double width, double the total width TW of the completed plate, symmetrically tapered side portions 106, 107 one on each side of a central flat portion 108 having a thickness, e.g., 0.072 inch greater that the final thickness, e.g. 0.070 inch of the finished open annular plate 74 and tapers in each tapered portion 106, 107 to a sufficiently smaller thickness at the side edges 111 and 112, e.g., 0.066 inch of the strip so that on edge rolling into an annulus the thickness is uniform. In some instances it is desirable to make the tapered portions 101 and 102 of the rollers very slightly concave or convex and thus the tapered portions 106, 107 of the tapered strip 99 convex or concave to provide a correction for obtaining a perfectly flat surface on the plates after the edge rolling step. It is preferred that each of the tapered or conical portions 101, 102 of both rolls 97, 98 have a two slope taper or conical element as shown in FIG. 11 with respect to taper or cone 102 on roll 97. The roll taper or cone 102 adjacent the flat or cylindrical portion 103 has a very low inner taper angle $a$, e.g., 0° 20', cone portion 109 which extends for less than half of the taper, distance $x$, and a very slightly larger outer taper angle $b$, e.g., 0° 28', cone portion 110 which extends for slightly more than half of the taper, distance $y$. The tapered strip 99 tapered portion 107 thus has a central taper 104 very gradually reducing strip thickness in about half the width near the thick edge and an outer taper 105 gradually reducing at a slightly higher rate in about half of the width near the thin edge 112.

The tapered double width strip 99 is then passed through the conventional roller leveling machine 113 which has a plurality of rollers 114 preferably five to seven or more to cold work strip 99 into a tapered rolled double width stress relieved strip 120 which is stress relieved, has the exact required dimensional requirements and is straight. Three rollers, 114 are shown to illustrate the relative transversely offset position of the axially consecutive rollers to undulate and thus cold work the strip. Each of the rollers 114 has a central cylindrical flat portion 117 having the same width as the central flat portions 103, 108 respectively of rollers 97 and 98 and of the strip 99 and tapered conical portions 115, 116 preferably having the same taper as the taper portions 101, 102 of roller set 96 and the taper portions 106, 107 of strip 99. The level rollers 114 in addition have shoulders 118 and 119 respectively at the end of the taper portions 115, 116 to define and roll the edges 111 and 112 of the rolled strip 120 to final smoothness and dimension.

While some final forming and dimensioning of the tapered portions could be effected in the roller leveling machine 113, this should be minimized by accurately forming the tapered portions in the rolling machine 96. The roller leveling machine 113 has a conventional coil feeder 121 to feed rolled tapered double width strip 99 through the rollers 114 for undulating and cold working under tension and recoiling of the stress relieved strip 120 by the conventional recoiler 122.

Figure 15:
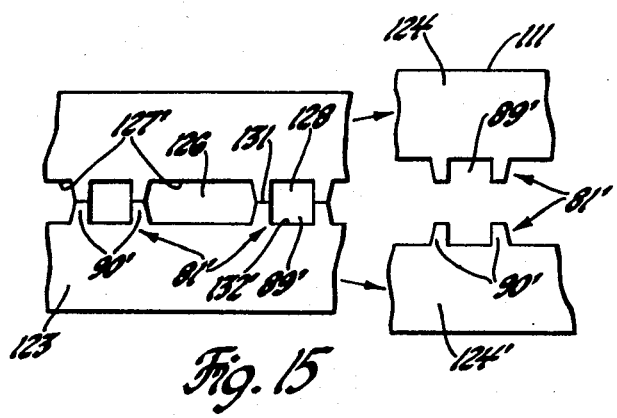
FIG. 15 is a partial enlarged diagrammatic view of the blank configuration of the blanked double width strip before and after separating.
Figure 17:
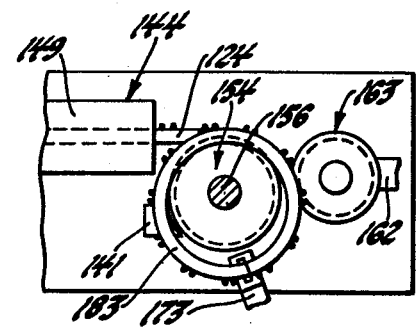
FIG. 17 is a partial diagrammatic plan view of the edge coiling machine parts engaging a strip during coiling.
Figure 16:
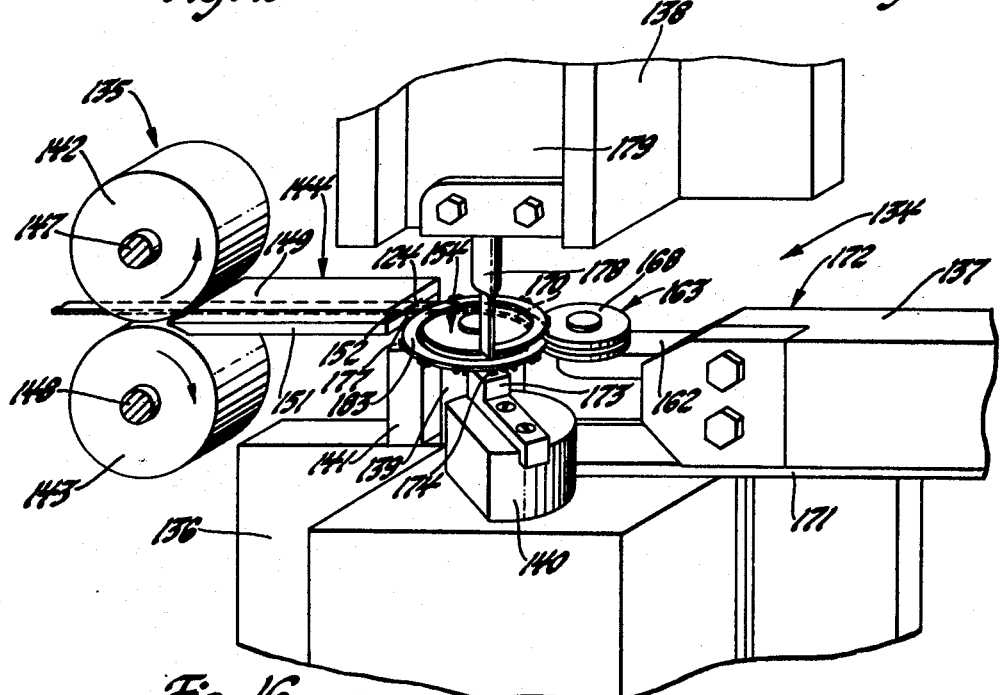
FIG. 16 is a partial diagrammatic perspective view of an edge coiling machine coiling a strip.
Figure 18:
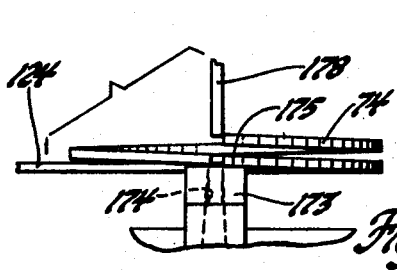
FIG. 18 is a partial detail view illustrating the cutoff tool operation relative to the edge coiled strip.
Figure 19:
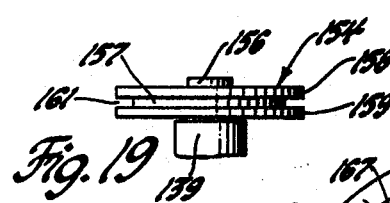
FIG. 19 is a partial view of a guiding mandrel roller.
Figure 20:
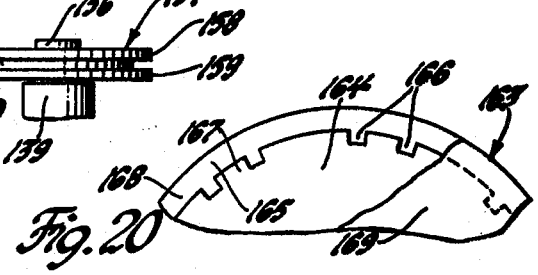
FIG. 20 is a partial view of a coiling roller having recesses to receive tangs.

The tapered double width stress relieved strip 120 is then blanked in the flat central portion 108 to form the blanked double width blank strip 123 which is divided into two identical single width tapered straight strips 124, 124' with prime spline tangs 81' as shown in FIG. 15 in a conventional blanking press 125. The blanked tapered double width strip 123 has in the central flat portion 108 alternating spaced apertures 126 forming the thick outer edge portions 127' between the prime splines 81' and apertures 128 centrally in the prime spline tangs 81' so each prime spline tang has a central recess 89' between two prongs 90' in order to effect proper formation of the plate with finished spline tangs 81 during the edge rolling operation. The blanked strip 123 is also slit down the middle by slit 131 and separated into two individual strips 124 and 124'. It is preferred that the blanking die in one stamping operation blank a sufficient length of strip to make one plate to avoid tolerance variations in the spline tang spacing in each plate. Referring to FIG. 13, the blanked tapered single width strip 124 is shown with a prime spline tang 81' between outer edge portions 127'. The prime spline tangs 81' have a recess 89' having a flat base 132' substantially aligned with edge portions 127' between the prongs 90'. The recess is preferably the same depth as the tang height for uniform face width but may be slightly shallower than the prong height relative to outer edge 127' to increase the strength of the finished prongs 90, FIG. 14. The prime spline prongs 90' have a contact face 133' having in the blanked strip 124 an angle $a$ to a perpendicular with the parallel strip edges centrally through the spline prong so that when the strip 124 is edge rolled into an annulus, FIG. 14, the finished spline prong 90 has a spline face 133 having a proper angle $b$ relative to a radius centrally through the prong to provide a proper spline face form. The angles $a$ and $b$ are essentially the same. The prongs 90 on both side faces are filleted into the outer thick edge of the strip 124, the outside contact face into thick edge 127 and the inside face into recess base 132 to reduce stress concentration during edge rolling and use of the completed open annular plates.

The blanked single width strips 124, 124' are then rolled in a modified edge rolling machine 134 as diagrammatically shown in FIGS. 8 and 16 to 20 to form the open annular plate 74. The edge rolling machine 134 has a power feed and guide mechanism 135 and a base 136 normally fixed on the machine frame (not shown) and a coiling roll head 137 adjustably pivotally mounted on the base. A shearing tool head 138 is conventionally six-way adjustably mounted on the frame and a mandrel support 139, an anvil 140 and guide cam 141 is conventionally six-way adjustably mounted, as by bolted plates not shown, on the base. The power feed and guide mechanism 135 has a series of pairs of power driven feed rolls located between portions of a strip guide as shown by the final pair of power driven feed rolls 142, 143 which have a conical or tapered cylindrical surface shaped to fit and match the tapered face surfaces of the single width tapered straight strip 124 and the final strip guide portion 144 which delivers the strip 124 to the coiling station 146. All the feed rolls have the same diameter and are conventionally mounted on a gear driven power shaft 147, 148 and driven at the same speed to cooperate to power feed the strip. The strip guide 144 has an upper and lower portion 149, 151 with a recess 152 in both portions at the parting line between the portions shaped to fit and match the faces of the strip and having a width equal to the total width of the strip 124 to hold the strip straight for entry to the coiling station.

The strip 124 first contacts the guide roll or mandrel roll 154 which is freely rotatably mounted in a fixed axial portion on mandrel shaft 156 fixed to mandrel support 139. The mandrel roll 154, FIG. 19 has a smooth cylindrical roller 157, since the internal or thin edge 111 of the strip 124 is smooth, and circular side guide disks 158, 159 to form an annular peripheral recess 161 to receive the strip. The roller 157 fits in depressions in the plates so foreign matter is not forced between them to separate them. The strip is fed so thin smooth edge 111 tangentially contacts the cylindrical surface of roller 157 to hold the strip straight to an initial coiling point where coiling begins. The recess 161 has a uniform depth 50 to 80% of the face width FW of the strip and a uniform width equal to or slightly larger than the mean thickness of the tapered strip 124 and thus the thickness of the coiled strip and completed plate 74. Preferably the recess has a depth slightly over 50% so the plates extend from the thin edge to the point of mean thickness of the strip and a width equal to the mean thickness of the strip so the coiled strip faces in the recess as the thin portion of the strip thickens and moves out of the recess are in fuller surface contact in the recess for guidance during coiling. The roller disks 158, 159 have a diameter 50 to 80% of the internal diameter of the finished plate. This roller diameter is large enough to laterally support and guide the strip during coiling but not so large that the completed coil cannot be easily removed after shearing.

The coiling roll head 137 has a support arm 162 to rotatably support and position the coiling roll 163. The coiling roll 163 is constructed like the guide roll 154 but the central cylindrical roller 164, FIG. 20, has recesses 166 to receive the prongs 90 of each spline tang 81 with rolling clearance and central tooth 167 with a cylindrical top to contact and support the base 132 of the recess 89 between the pair of prongs of each spline tang. The paired recesses 166 are circumferentially equally spaced the same distance as the spline tangs 81 on the coiled strip and the cylindrical roller has a diameter, i.e., 50% or larger, of the completed plate diameter to exactly accommodate a whole number of equally spaced pairs of recesses. The roll 163, also has side disks 168, 169 providing an annular recess 165 to receive and guide the strip during coiling. The annular recess has a depth 50 to 80% of the face width of the strip and a width equal to the thickness of the coiled strip and finished annular plate 74 to maintain flatness during coiling. The guide 144 and preferably also the recess 161 of mandrel roll 154 and the recess 165 of the coiling roll thus contact a large area of both faces of the strip 124 in the coiling station before and from the initial coiling point to the final coiling point where the thick edge 127' is in tangential contact with coiling cylinder 164 to prevent buckling during coiling to produce flat coils. The head 137 is fixed on a support 171 resting on base 136 and having a bearing (not shown) pivotally mounting the support on mandrel support 139 or on a pivot (not shown) on the center axis of the coiled strip. The attachment of coiling head 137 to the arm 162 and the support 171 are adjustable and the angular position of the coiling roll assembly 172, the support 171, head 137 and coiling roll 163, is adjustable as the angular position of the coiling roll 163 determines the diameter of the open annular plate 74.

To initiate the continuous coiling operation of the coiling machine the initial end of strip 124 is curved to provide the strip with an initially curved portion or starting coil 170, FIG. 8 which is merely sufficient so the curved portion contacts the guide roll 154 and coiling roll 163 when the coiling roll is set in the proper coiling position. The straight strip 124 is placed in the coiling machine and fed past the guide roll sufficiently so the end can be curved to engage the coiling roll so continuous feed operation can be initiated. With the straight strip 124 extending through the guide roll 154 the end is curved manually with a tool or by manually moving the coiling roll from a position engaging the external thick edge of the straight strip 124 to the coiling position to initially curve the initial portion of the strip. When the strip is in the coiling machine with the initial portion bent and the coiling roll is in coiling position, the feed and guide mechanism 135 is operated to power feed the strip 124 to the guide roll and coiling roll for continuous coiling of annular plates.

As the coiled strip 124 leaves the coiling roll 163 it passes over the fixed shear tool or die 173 having a rectangular die opening 174 longer than the width FW of the coiled strip, as wide as gap 82 and having cutting edges on the long sides positioned radially with respect to the coiled strip. The top surface 175 of the die 173 has a cam surface. The initial end of the strip 124 engages this cam surface centrally and slightly lifts the coiled strip so it rests on surface 175. An additional cam guide 141 with a sloped cam surface 177 may be used to insure lifting the coiled strip just sufficiently high to pass over the disk 158 of guide roll 154 and over disk 168 of coiling roll 163. When the initial end and each subsequent cut initial end of the strip are in the proper position at the first cutting edge of opening 174 the movable shear punch 178 fixed on the slide 179 is moved to shear punch the coiled strip 183 to shear out a slug to form gap 82 and cut off an open annular friction plate during continuous movement of the strip. The slide is a conventional power operated shear tool slide and is controlled by a timing control connected to the feed mechanism 135 for shearing during a momentary stop of the continuous feed. The open annular plate is then removed by a conventional unloading mechanism. Preferably the coiling machine is positioned on the frame to form the coil and open annular plate in a vertical position for unloading by gravity after cut off. The ends 83 of the completed disk are then coined, preferably during shearing, to the beveled form shown in FIGS. 4 and 5.

An alternative method of cutting off the coiled strip 183 to form plate 74 is shown in FIGS. 21 to 24. This arrangement employs a pair of forming tools 181 and 182, coining tools or milling cutters, to form in each side of the coiled strip 183 a similar tapered recess 184, 185 having a taper or bevel 186 at each end and a central portion preferably flat. The milled recess would not stress the strip and would be made in the straight strip and during coiling trigger the operation of the cut off or slitting tool. Then a slitting tool 187 slits, or a shearing tool cuts the thinner central portion of the strip between the recesses 184, 185 centrally of the length of the recesses to provide beveled ends 188 which are the functional equivalent of the ends 83' of FIG. 5. The unfinished slit end edge portions 189 need not be finished since they do not come in contact with the friction material or each other during operation of the plate disk. This cut off process may be employed on the coiling machine 134 shown in FIG. 16 by using two slide heads which are sequentially spaced and sequentially operated in timed relation to the strip feed to form the recesses at a first cut off station and then with continued movement of the strip to position the recesses portion of the strip at a second cut off station for the cut off operation.

The tapered single width strips 124 after they are formed in the blanking step in press may be deburred in the conventional deburring apparatus 196. The open annular plates 74 after edge rolling or flattening are deburred in deburring apparatus 197.

The process of manufacturing the open annular friction plates 74, while described above in conjunction with the machine and apparatus used, is summarized below with particular reference to FIG. 8. The sheet material stock 91 used in this process is a carbon steel having a high hardness and a high degree of flatness and surface finish similar to that used in the known blanking processes for making complete annular friction plates. Since this process in the taper rolling step in the taper rolling machine, the level rolling step in the level rolling machine 113 and the edge rolling step in the edge rolling machine 134 provides more cold working of the steel and these carbon steels are cold work hardenable, the sheet material stock 91 preferably has a lower hardness which is increased in this process substantially to the usual degree of hardness about Rockwell B85 to B100 used in friction plates. The lower hardness, Rockwell B85, is preferred for increased flexibility in open annular plates. Also since this process includes the taper rolling step in the taper rolling machine, the sheet material stock does not require such a high degree of flatness and surface finish and thus less expensive sheet material stock may be used.

The sheet material stock 91 is slit in a continuous feed slitting machine 92 into flat double width strips 93 having a thickness slightly greater than the friction plate and a width slightly or sufficiently less than the tapered double width strip 99. The flat double width strip is then rolled in a conventional continuous feed rolling mill or machine preferably of the multiple pass or roll set type having symmetrically tapered rolls to form the tapered double width strip 99 which has identical symmetrical portions on each side of the short center line to be divided into single width strips which are symmetrically tapered. This double width strip preferably has a flat central portion and symmetrical side portions symmetrically tapered. The rolling of this symmetrical configuration of the tapered double width strip provides a very uniform distribution of the cold working and cold work hardening.

Then the tapered double width strip 99 is continuously fed and pulled to pass, under tensions, through a level rolling machine 113 having rollers 114 with a tapered cylindrical surface formed to match the tapered surface of the tapered double width strip to relieve stress, straighten the strip and smooth the thin edges.

Then the straightened and tapered double width strip 120 is blanked in a press 125 to form the straight thick edge portions 127' with the prime prong spline tangs 81' equally spaced along the thick edge of each tapered portion and to centrally divide the double width strip 123 into two identical tapered single width strips 124, 124' having prime spline tangs 81' along the thick edge 127' and tapering in cross section to a thin edge 111, 112 and having a mean thickness in the center portion equal to the thickness of friction plate 74.

The tapered single width strips 124 are then edge rolled in the edge rolling machine 134 into open annular friction plates 74. The edge rolling machine has a power feed and guide mechanism 135 to continuously feed the single width strip to the coiling station and a guide mandrel in the coiling station contacting the inner thin edge of the strip at the initial point where the straight strip is initially bent into a coil. The guide mandrel is a roll 154 having a cylindrical surface contacting the thin edge of the strip 124 and side disks contacting the tapered portion of the strip at the mean thickness to keep the coil flat in the initial and coiling portion of the coiling station. The coil portion 170 then contacts the coiling roll 163 with the outside edge 127 with tangs 81 contacting the cylindrical surface of cylindrical roller 164 with recesses 166 to receive the tangs 81 to coil the strip 124 between the mandrel and coiling rolls. The straight tapered single width strip 124 is bent or coiled to the coil curvature or radius between the guide roll 154 and coiling roll 163 so the tapered strip in this initial coil portion 170, by being stretched or elongated and thinned at the outer edge 127 and compressed or shortened and thickened at the inner edge, is changed from the tapered cross section shape to a rectangular cross section shape having flat faces. It will be seen that there is a stable lengthwise center line of the strip during coiling that remains the same in length and thickness. That radially outward of the stable center line there is increasing elongation proportional to the radial outward distance and a porportional increase in thickness due to the taper in the straight strip so that on coiling the opposite side faces are flat and parallel and have the same thickness at the stable center line. Similarly radially inward of the stable center line there is increasing shortening proportional to the radial inward distance and a proportional decrease in thickness due to the taper so that on coiling the opposite side faces are flat and parallel and have the same thickness as at the stable center line and the outer portion. The stable center line is about at the center of mass of the tapered section which is nearer the thick edge depending on the taper or about two thirds the distance from the thin edge rather than at the dimensional center line halfway between the thin and thick edge. Also compression inside the stable center line provides slightly more thickening as compared to the elongation outside of the stable center line providing thinning so the final plate thickness is slightly greater than the average of the thickness at the thick edge and thin edge. Thus the coil portion 170 entering the guide recess 165 between disks 168, 169 of coiling roll has the final rectangular section of friction plate 74 and thus recess 165 fits at least 50% of the coil with only sufficient clearance for movement so it positively holds the coil flat during coiling.

As the coiled strip continuously leaves the coiling roll 163 to form a full annular coil it passes over the fixed shear tool 173 which may initiate raising the coil and may also engage cam surface 177 to raise the coil so the free end is raised just enough to pass over the disk 158 of guide roll 154 and disk 168 of coiling roll 163. The small amount of lateral bending of the coil required to clear the rolls is well within the elastic limits so there is no permanent deflection. Then as the free end of the coiled strip enters the shearing station and is aligned with the first cutting edge of the die opening 174 the punch 178, which is wider than the coil, punches out a slug to form gap 82 and cut off an open annular friction plate 74. The plates are deburred after the final step or after blanking.

A modified process as shown in FIG. 27, similar to the above edge rolling process shown in FIG. 8, may be used to make the continuous annular plates 73 and also the open annular plates 74. In the process diagrammatic view of the process steps, FIG. 27, the blocks indicate the type of process step and machine and the connecting material flow lines indicate material flow with a cross section view of the material above the flow line and a plan view of the material below the flow line. This modified process includes the initial step of slitting the sheet stock 91 in the slitter 92 to form the flat straight strips 216. The strips 216 could be formed in accordance with the FIG. 8 process by roll tapering an oversize double width strip in a roll tapering machine 96, roller leveling in a roller leveling machine 113 and blanking without forming tangs, or merely slitting to divide the double width strip into two oversize tapered single width strips with smooth straight edges or rolling a single width tapered strip from strip or rod stock. The strips 216 are ample or oversize single width flat or tapered strips which are edge rolled and slit sheared in the same edge rolling machine 134 to form an open annular plate 217 with the ends 218 essentially in contact at the gap or slit 219. Since the strips 216 are flat the open annular plate 217 has a cross section thicker at the inner diameter than at the outer diameter. Since the strip 216 does not have projecting spline tangs at one side the guide 154 and coiling rollers 163 of the edge rolling machine have plain cylindrical rolling surfaces. The welding and scarfing step employs conventional welding equipment 220 such as gas welding, electric resistance welding or plasma arc welding. The weld should have a thickness slightly less than the thickness of the finished plate so the next step, coining, provides uniform flatness and thickness. It is preferred that the blanking dies do not cut the weld and the weld is located within the transverse dimension or face width of the finished plate. When the coil being formed in the coiling machine 134 is sheared with full thickness free ends 218 the weld at these ends is scarfed as by grinding on both faces to reduce the weld thickness to slightly less than the final plate thickness. When the coiled plate is beveled and reduced in thickness at the shear point as in the alternative cut off method described above and shown in FIGS. 21 to 24, the sheared ends 188 on each coil have a thickness less than the final plate thickness and are butt welded together. Thus the thickness of the coil blank 217 at the weld may be reduced by scarfing, by grinding or stamping either before or after the weld is made. These steps of the process complete the coiled continuous annulus 221 having the ends connected together by weld 222. The coiled annulus continues to have a tapered radial cross section. The welded annulus 221 then proceeds to the coining step provided in a coining press 226 which forms a flat annular oversize plate 227 having the same weld 222. Since the weld is thinner than the finished thickness of the plate the weld is not coined. The coined plates 227 have a high degree of flatness and uniform thickness except for a slight depression at the weld. If tapered strip stock is used so the annulus 221 has an essentially rectangular section, less coining is needed to provide a high degree of flatness and uniform thickness. Then the flat annular plates 227 are blanked in a blanking press into a complete continuous annular friction plate 73 with internal spline tangs 84. The continuous annular friction plate has the weld 222 slightly below the face surfaces. A continuous annular friction plate may be similarly formed with external spline tangs and then sheared at the weld to form open annular plates 74. These blanked plates are then conventionally deburred to produce continuous or open annular friction plates.

The modified tapered plate 201 shown in FIG. 25 is edge rolled by a process similar to the above described process shown in FIG. 8 but the strips are not taper rolled or roller leveled. The edge rolled flat straight strips will form a tapered plate 201 as shown in FIG. 25 having a thin outer edge 202 and spline tangs 203 thickening to the thickness of the strip before edge rolling. The spline tangs 203 are made like the above spline tangs 81 to permit edge rolling. These plates also have a gap but may be welded as in the FIG. 27 process. The rolling operation will thicken the inner edge 204 and the faces 206 and 207 are tapered. The taper has been exaggerated in the drawing for purposes of illustration. In one example a steel disk edge rolled from a flat strip to form a disk having an outer diameter about 6 inches and a face width of about 0.6 inch had an inner edge 0.005 inch thicker than the outer edge. The cooperating faced plates 208 have flat stamped or edge rolled and welded complete annular steel plates 209 having internal splines 211 and are faced with friction material disks 212 having a flat face 210 bonded to the steel disks 209 and having a thickness increasing from the inner edge to the outer edge to provide a tapered face 213 tapering inversely relative to tapered faces 206, 207 of the cooperating steel plate 201. These tapered unfaced steel plates 201 and inversely tapered friction material faced plates 208 are alternately assembled into a friction plate pack with good interface surface contact for smooth operation.

It will be appreciated that the open annular friction plate, the friction torque establishing device emloying this plate and the processes of manufacturing the open annular plates and the closed annular plates in accordance with this invention may be modified. I claim:

1. A method of manufacturing thin, flat and uniformly thick annular friction plates from thin flat long narrow straight sheet metal strips having inner and outer edges with a width sufficient to provide the full radial width of the annular friction plates and a thin thickness sufficiently larger to provide the thickness of said annular friction plates; the step of continuously edge coil rolling the straight strip into a flat annular coil by continuous power feeding the straight strip in a positive straight guide to a coiling station with the inner edge of the straight strip first contacting a mandrel roller and then curving into a coil with the outer edge of the coil contacting a coiling roller positioned to form the straight strip into a coil forming strip portion of an annular coil strip having the radius of the annular friction plates and with portions of the face surfaces of the coil forming strip portion of the annular coil strip in contact with coil forming lateral guide disks on each side of each roller and a portion of the coil forming strip portion being flat and uniform thickness and in surface to surface contact with the facing faces of the guide disks on one roller and the portion of the coil forming strip portion having a tapered cross section being in contact with a portion of the facing faces of the guide disks on the other roller to maintain the coil forming portion in a thin flat annulus during coil strip forming and with continuous power feeding forming a complete annular coil strip beyond the coiling roller; the step of cutting off each complete annular coil strip during continuous feeding to form thin flat annular coils with the ends in close proximate relation; the step of forming the strip to a cross section shape so the annular friction plates are uniformly thick and the step of forming spline tangs and intermediate smooth portions on one of the inner and outer edges of the strip and forming a smooth finished edge on the other of the inner and outer edges of the strip so the annular friction plates have one edge with spline tangs and intermediate smooth portions and the other edge smooth.

2. A method of manufacturing thin, flat and uniformly thick annular friction plates from thin, flat and uniformly thick sheet metal stock including the step of slitting the sheet metal stock into thin flat long narrow straight sheet metal strips having inner and outer edges with a width sufficient to provide the full radial width of the annular friction plates and a thin thickness sufficiently larger to provide the thickness of said annular friction plates; the step of continuously edge coil rolling the straight strip into a flat annular coil by continuous power feeding the straight strip in a positive straight guide to a coiling station with the inner edge of the straight strip first contacting a mandrel roller and then curving into a coil with the outer edge of the coil contacting a coiling roller positioned to form the straight strip into a coil forming strip portion of an annular coil strip having the radius of the annular friction plates and with portions of the face surfaces of the coil forming strip portion of the annular coil strip in contact with coil forming lateral guide disks on each side of each roller and a portion of the coil forming strip portion being flat and uniform thickness and in surface to surface contact with the facing faces of the guide disks on one roller and the portion of the coil forming strip portion having a tapered cross section being in contact with a portion of the facing faces of the guide disks on the other roller to maintain the coil forming portion in a thin flat annulus during coil strip forming and with continuous power feeding forming a complete annular coil strip beyond the coiling roller; the step of cutting off each complete annular coil strip during continuous feeding to form thin flat annular coils with the ends in close proximate relation; the step of forming the strip to a cross section shape so the annular friction plates are uniformly thick and the step of forming spline tangs and intermediate smooth portions on one of the inner and outer edges of the strip and forming a smooth finished edge on the other of the inner and outer edges of the strip so the annular friction plates have one edge with spline tangs and intermediate smooth portions and the other edge smooth.

3. A method of manufacturing thin, flat and uniformly thick annular friction plates from thin, flat and uniformly thick sheet metal stock comprising the step of slitting and forming the sheet metal stock into thin long narrow straight sheet metal strips having inner and outer edges with a width sufficient to provide the full radial width of the annular friction plates and a thin thickness sufficiently large to provide said thin flat annular friction plates; the step of continuously edge coil rolling the straight strip into a flat annular coil by continuous power feeding the straight strip in a positive straight guide to a coiling station with the inner edge of the straight strip first contacting a mandrel and then curving into a coil with the outer edge of the coil contacting a coiling roller positioned to form the straight strip into a coil forming portion of an annular coil having the radius of the annular friction plates and with portions of the face surfaces of the coil forming portion of the annular coil in surface contact with coil forming lateral guides to maintain the coil forming portion in a flat annulus during coil forming and with continuous power feeding forming a complete coil beyond the coiling roller; the step of cutting off each complete coil during continuous feeding to form annular coils with the ends in close proximate relation and the step of forming spline tangs on one of the inner and outer edges and forming the other of the inner and outer edges smooth.

4. A method of manufacturing thin, flat uniformly thick open annular friction plates comprising the step of rolling a thin, flat and uniformly thick long and narrow straight metal strip into a transversely tapered straight strip having a leading end, mean thickness centrally of the strip, a thick longitudinal edge and a thin longitudinal edge with the thick edge sufficiently thicker than the thin edge so that on forming into an annulus the entire annulus has the same thickness equal to the mean thickness and both edges have the same thickness; the step of blanking spline tangs in said thick edge at equally spaced intervals with each spline tang having a central recess with a prong at each side of the recess and a straight recess base between the prongs; the step of edge coil rolling said transversely tapered strip by continuously feeding and positively guiding the tapered straight strip to a coiling station having a mandrel engaging the thin edge and a coiling roll coiling the straight strip to a circle and having a cylindrical surface engaging in rolling contact with said now circular thick edge and each now circular recess base between the prongs with relief recesses to receive the prongs to coilsaid straight strip between said mandrel and coiling roll into a thin flat coil strip having the radius of the annular friction plate and a uniform thickness substantially equal to said mean thickness and said coiling roll having guide disks spaced apart said mean thickness to make said coil strip flat and further continuously feeding said strip to form a complete annular coil with the leading end past the coiling roll and the step of cutting a narrow gap slug out of said complete annular coil strip at the leading end to cut off said coil strip to provide a trailing end to form an open annular friction plate with flat side surfaces, uniform thickness and a narrow gap between closely spaced free ends in annular alignment.

5. The method of manufacturing defined in claim 4 and said steps being performed in the sequence recited on cold work hardenable sheet steel stock hardened in each step and said step of rolling providing in cross section a symmetrical double width flat straight strip having a central thick portion with symmetrical single width strips on each side which are symmetrically tapered from the central thick portion initially at a small slope and then at a slightly larger slope to the thin edges; the step of stress relieving the double width strips by level rolling on rollers located above and below the mean line of movement of the strip and having a contoured surface matching the strip cross section and side shoulders for stress relief and smoothing the thin edges; the step of blanking and dividing the double width strip being performed in the thick central portion to provide two single width strips having on the thick edge of each tapered single width strip a thick edge with spaced spline tangs each having said recess and prongs; and the step of edge coil rolling using said single width tapered strips and said mandrel being a roller having lateral guide disks centrally contacting said tapered single width strip.

6. A method of manufacturing thin, flat and uniformly thick annular friction plates comprising the step of slitting flat sheet metal stock into a thin, flat and uniformly thick long narrow straight strip having a leading end, and being sufficiently thicker than the friction plate to provide the desired friction plate thickness and sufficiently wide to provide an annulus wider than the annular friction plate; the step of edge coil rolling said straight strip by continuously feeding and positively guiding the straight strip to a coiling station having a mandrel engaging the inner edge and a coiling roll having a cylindrical surface engaging the outer edge to coil said straight strip between said mandrel and coiling roll into a thin flat coil strip having the radius of the annular plate and a thickness tapering in cross section from the thickened inner edge to the thinned outer edge relative to the mean thickness which remains the same as said straight strip thickness and lateral guides to make said coil strip flat and further continuously feeding said strip to form a complete annular coil strip with the leading end past the coiling roll; the step of cutting off said complete flat annular coil strip at the leading end to provide a trailing end to form an open flat annular complete coil strip with flat side surfaces, uniform thickness and closely adjacent free ends in annular alignment; the step of welding said closely spaced ends together in a central portion of the thickness so the weld has a thickness less than the thickness of the friction plate to form a continuous flat annular coil strip; the step of coining the continuous flat annular coil strips with tapered cross section and welded ends in a coining press into a continuous flat annular coil strip having a uniform thickness equal to the thickness of the friction plate except for the thinner weld, an inner diameter less than the inner diameter of the friction plate and an outer diameter more than the outer diameter of the friction plate and the step of blanking the uniformly thick flat continuous annular strip by blanking the inner and outer edges and spline tangs on one edge to make a continuous thin flat annular friction plate having uniform thickness.

7. In an edge coil rolling machine; a frame; guide means fixed on said frame contacting a thin long narrow straight strip having longitudinal faces and edges with one edge being smooth and the other edge with centrally recessed equally spaced tangs and having a high ratio of cross section face width to thickness between faces on all longitudinal face and edge surfaces to positively guide and hold the strip straight during feeding of the strip to a coiling station; power feed means to continuously longitudinally feed said strip through said guide means to said coiling station; mandrel means having a mandrel roller fixed on said frame and having a cylindrical surface positioned to tangentially contact one of said edges of said strip to support said strip on said one edge and a pair of round guide disks, one fixed on each side of said mandrel roller and extending at least about one half the face width of the strip beyond said mandrel roller and centrally contacting both faces of the strip to hold the strip against lateral movement and thus flat; a coiling roller mounted on said frame in a coiling position having a cylindrical surface operative to contact the other of said edges of the strip being coilled and with continuous longitudinal feeding of said straight strip to continuously coil said straight strip during movement in a circular coiling path from said mandrel roller to said coiling roller into a constant radius coil; a pair of round guide disks, one fixed on each side of said coiling roller and extending at least about one half the face width of said strip beyond said coiling roller and contacting both faces of the strip in full surface contact to prevent lateral movement and operative with said mandrel roll guide disks to keep the strip flat during coiling; the one of said mandrel and coiling rolls engaging the other edge with recessed tangs having a cylindrical surface with recesses of a size to freely receive spline tangs equally peripherally spaced on the cylindrical surface of said coiling roller a distance equal to the spline tang spacing and a tooth in each recess on said coiling roller engaging the base of the recess in the spline tang to support the strip centrally of the spline tangs during coiling; guide means fixed to said frame in the continuing circular path from said coiling roll to said guide roll from between said coiling roller to said mandrel roller to guide the coiled strip after leaving the coiling roller to pass just to one side of said mandrel roller and coiling roller to form a complete 360° coil strip with the leading end past said coiling roller and shearing means operative in timed relation with said feeding means to cut out a transverse slug to completely cut off said complete 360° coil at the leading end of the coil so exactly 360° of strip is removed and a new leading end is provided on the strip being coiled and to provide a trailing end on the completed friction plate spaced a small distance from the leading end to provide a flat annular friction plate with a gap between free ends.

8. In an edge coil rolling machine; a frame; guide means fixed on said frame contacting a thin long narrow straight transversely tapered strip having longitudinal faces and edges with the thin edge being smooth and the thick edge with centrally recessed equally spaced tangs and having a high ratio of cross section face width to thickness between faces on all longitudinal face and edge surfaces to positively guide and hold the strip straight during feeding of the strip to a coiling station; power feed means to continuously longitudinally feed said strip through said guide means to said coiling station; mandrel means having a mandrel roller fixed on said frame and positioned to tangentially contact the one smooth edge of said strip to support said strip on said one edge and a pair of round guide disks, one fixed on each side of said mandrel roller and extending at least about one half the face width of the strip beyond said mandrel roller and centrally contacting both faces of the strip to hold the strip against lateral movement and thus flat; a coiling roller mounted on said frame for movement from a loading position to a coiling position having a cylindrical surface with recesses of a size to freely receive spline tangs equally peripherally spaced on the cylindrical surface of said coiling roller a distance equal to the spline tang spacing and a tooth in each recess on said coiling roller engaging the base of the recess in the spline tang to support the strip centrally of the spline tangs operative in said loading position to contact the other edge of the straight strip and on movement from said loading position to said coiling position to coil the initial portion of the straight strip into a coil portion and then with continuous longitudinal feeding of said straight strip continuously coiling said straight strip during movement in a circular coiling path from said mandrel roller to said coiling roller into a constant radius coil; a pair of round guide disks, one fixed on each side of said coiling roller and extending at least about one half the face width of said strip beyond said coiling roller and contacting both faces of the strip in full surface contact to prevent lateral movement and operative with said mandrel roll guide disks to keep the strip flat during coiling; guide means fixed to said frame in the continuing circular path from said coiling roll to said guide roll from said coiling roller to said mandrel roller to guide the coiled strip after leaving the coiling roller to pass just to one side of said mandrel roller and coiling roller to form a complete 360° coil strip with the leading end past said coiling roller and shearing means operative in timed relation with said feeding means to cut out a transverse slug to completely cut off said complete 360° coil at the leading end of the coil so exactly 360° of strip is removed and a new leading end is provided on the strip being coiled and to provide a trailing end on the completed friction plate spaced a small distance from the leading end to provide a flat annular friction plate with a gap between the free ends.

9. A method of manufacturing thin, flat and uniformly thick annular friction plates from a thin, transversely tapered, long and narrow straight metal strip stock having a leading end, a thick longitudinal stock edge and a thin longitudinal stock edge with said thick stock edge being sufficiently thicker than said thin stock edge so that on forming into an annulus the entire annulus has the same thickness substantially equal to the mean stock thickness and both said edges have the same thickness; the step of blanking said strip stock at one of said stock edges to form a blanked strip with a straight prime edge with prime spline tangs at equally spaced intervals with each prime spline tang having a height and a central recess of a depth substantially equal to said height to provide a prime prong at each side of said recess having a prime spline face at a prime spline angle to said straight prime edge and a straight recess base between said prime prongs substantially aligned with said prime edge; and the step of edge coil rolling said transversely tapered blanked strip by continuously feeding and positively guiding said blanked strip leading end to a coiling station having a mandrel roll engaging the thinner one of said prime edge and other stock edge, and a coiling roll engaging the other of said prime edge and other stock edge and coiling the straight blanked strip to a circle, and said mandrel and coiling rolls each having a cylindrical surface engaging in rolling contact with the engaged edge which is now circular and the one of said rolls engaging said prime edge having relief recesses in its cylindrical surface to receive said prongs and its cylindrical surface engaging said prime edge and recess base to coil said blanked strip between said mandrel and coiling rolls into a thin flat coil strip having the radius of said annular friction plate and a uniform thickness substantially equal to said mean thickness and spline prongs having a spline face at the spline angle relative to a radius of said circle of said coil strip, and said coiling roll having guide discs spaced apart by said mean thickness to hold said coil strip flat and further continuously feeding said strip to form a complete annular coil.

* * * * *

UNITED STATES PATENT AND TRADEMARK OFFICE
CERTIFICATE OF CORRECTION

PATENT NO. : 4,077,107
DATED : March 7, 1978
INVENTOR(S) : David F. Reuter

It is certified that error appears in the above-identified patent and that said Letters Patent are hereby corrected as shown below:

Column 3, line 24, "will" should read -- with --.
Column 4, line 22, "drive" should read -- driven --;
          line 23, "10" should read -- 19 --.

Column 5, line 29, "drives" should read -- drive --.

Column 7, line 23, "wil" should read -- with --.

Signed and Sealed this

Seventeenth Day of October 1978

[SEAL]

Attest:

RUTH C. MASON
Attesting Officer

DONALD W. BANNER
Commissioner of Patents and Trademarks